United States Patent
Ramaswamy et al.

(10) Patent No.: US 11,290,355 B1
(45) Date of Patent: Mar. 29, 2022

(54) METHODS AND SYSTEMS FOR FLOW LOG COMPRESSION AND COORDINATION

(71) Applicant: Pensando Systems Inc., Milpitas, CA (US)

(72) Inventors: Pavithra Ramaswamy, Fremont, CA (US); Shrey Ajmera, Milpitas, CA (US)

(73) Assignee: Pensando Systems, Inc., Milpitas, CA (US)

( * ) Notice: Subject to any disclaimer, the term of this patent is extended or adjusted under 35 U.S.C. 154(b) by 0 days.

(21) Appl. No.: 17/182,030

(22) Filed: Feb. 22, 2021

(51) Int. Cl.
| | |
|---|---|
| G06F 15/173 | (2006.01) |
| H04L 43/026 | (2022.01) |
| H04L 43/04 | (2022.01) |
| H04L 43/02 | (2022.01) |
| H04L 43/06 | (2022.01) |
| H04L 43/062 | (2022.01) |
| H04L 43/067 | (2022.01) |
| H04L 9/40 | (2022.01) |

(52) U.S. Cl.
CPC ...... *H04L 43/026* (2013.01); *H04L 29/06897* (2013.01); *H04L 43/02* (2013.01); *H04L 43/04* (2013.01); *H04L 43/06* (2013.01); *H04L 43/062* (2013.01); *H04L 43/067* (2013.01)

(58) Field of Classification Search
CPC ............. H04L 43/026; H04L 29/06897; H04L 43/067; H04L 43/062; H04L 43/06; H04L 43/02; H04L 43/04
USPC .................................................. 709/224, 247
See application file for complete search history.

(56) References Cited

U.S. PATENT DOCUMENTS

| | | | |
|---|---|---|---|
| 7,558,290 B1 | 7/2009 | Nucci et al. | |
| 7,778,979 B2 | 8/2010 | Hätönen et al. | |
| 9,923,757 B1* | 3/2018 | Hester | ................. G06F 16/2246 |
| 2005/0138483 A1* | 6/2005 | Hatonen | ............... G06F 21/552 |
| | | | 714/45 |
| 2007/0005388 A1* | 1/2007 | Busch | .................. G06Q 10/063 |
| | | | 719/318 |
| 2013/0036101 A1* | 2/2013 | Marwah | .................. H03M 7/30 |
| | | | 707/693 |

(Continued)

OTHER PUBLICATIONS

Akin, Mustafa, "Analyzing AWS VPC Flow Logs using Apache Partquet Files and Amazon Athena", <https://engineering.opsgenie.com/analyzing-aws-vpc-flow-logs-using-apache-parquet-files-and-amazon-athena-27f8025371fa>, Feb. 27, 2018, 16 pgs.

(Continued)

*Primary Examiner* — Johnny B Aguiar
(74) *Attorney, Agent, or Firm* — Loza & Loza LLP

(57) ABSTRACT

A compressed flow log can be created from flow log entries. Flow log entries include field values for flow log fields. The entries can be compressed based on tuples (e.g., primary tuple, secondary tuple, tertiary tuple, etc.) specified by tuple definitions that specify the flow log fields in tuple content values. A first primary tuple content value can be based on a primary tuple definition and the field values of a first flow log entry included in flow log entries. A first primary tuple symbol can be associated with the first primary tuple content value. The first flow log entry can be used to create a first compressed flow log entry that includes the first primary tuple symbol. The first compressed flow log entry can be included in the compressed flow log, and the compressed flow log can be transmitted to a flow log consumer.

20 Claims, 14 Drawing Sheets

(56) References Cited

U.S. PATENT DOCUMENTS

2016/0006663 A1* 1/2016 Zhang .................... H04L 47/33
709/234
2016/0226976 A1* 8/2016 Ciabarra, Jr ............ H04L 67/02

OTHER PUBLICATIONS

Fullmer, Mark,"The OSU Flow-tools Package and Cisco NetFlow Logs, USENIX, Proceedings of the 14th Systems Administration Conference (LISA 2000)", New Orleans, Louisiana, USA, Dec. 3-8, 2000, 14 pgs.

* cited by examiner

METHODS AND SYSTEMS FOR FLOW LOG COMPRESSION AND COORDINATION

TECHNICAL FIELD

The embodiments relate to computer networks, ethernet, channel adapters, network interface cards, network appliances, routers, switches, load balancers, network traffic flow logging, packet processing pipelines, P4 packet processing pipelines, and to compressing and coordinating network traffic flow logs.

BACKGROUND

Flow logs can store a record of network traffic processing events that occur on a computer network. For example, the network appliances providing network services for a network can create a log entry for each network packet received, for each network packet transmitted, for flow creation, for flow update, for flow deletion, and for other events. Network appliances processing network traffic flows can produce network flow logs and can forward the flow logs to a central resource that collects and processes flow logs.

Those practiced in the arts of computers, computer networks, and computer networking devices are familiar with a large number of notoriously well-known acronyms that are used to reference common. Those terms include programming protocol-independent packet processors (P4), non-volatile memory express (NVMe), field programmable gate array (FPGA), arithmetic logic unit (ALU), hypertext transport protocol (HTTP), uniform resource locator (URL), transmission control protocol (TCP), TCP final (TCP-FIN), TCP FIN acknowledge (TCP FIN ACK), read only memory (ROM), random access memory (RAM), content addressable memory (CAM), integrated circuit (IC), inter-integrated circuit (I2C), input/output (IO), universal serial bus (USB), universal asynchronous receiver-transmitter (UART), serial peripheral interface (SPI), embedded multi-media controller (eMMC), virtual machine (VM), double data rate 4 (DDR4), synchronous dynamic random-access memory (SDRAM), static random-access memory (SRAM), public key algorithm (PKA), and cyclic redundancy check (CRC).

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method can include creating a compressed flow log from a plurality of flow log entries that include a plurality of field values for a plurality of flow log fields, determining a first primary tuple content value based on a primary tuple definition and the field values of a first flow log entry that is one of the flow log entries, associating a first primary tuple symbol with the first primary tuple content value, using the first flow log entry to create a first compressed flow log entry that includes the first primary tuple symbol, including the first compressed flow log entry in the compressed flow log, and transmitting the compressed flow log to a flow log consumer, wherein the primary tuple definition indicates a first subset of the flow log fields.

Another aspect of the subject matter described in this disclosure can be implemented by a method implemented by a network node. The method can include creating a compressed flow log from a plurality of flow log entries that include a plurality of field values for a plurality of flow log fields, participating in a network traffic flow with a second node, and transmitting the compressed flow log to a flow log consumer, wherein the network node is configured to initiate a cleanup of the network traffic flow by sending a termination request to the second node, the second node is configured to send a termination acknowledgement to the network node in response to receiving the termination request, the network node is configured to include a record of the cleanup of the network traffic flow in the compressed flow log, and the second node is configured to send no record of the cleanup of the network traffic flow to the flow log consumer after receiving the termination request.

Yet another aspect of the subject matter described in this disclosure can be implemented by a network node. The network node can be configured to create a compressed flow log from a plurality of flow log entries that include a plurality of field values for a plurality of flow log fields, determine a first primary tuple content value based on a primary tuple definition and the field values of a first flow log entry that is one of the flow log entries, associate a first primary tuple symbol with the first primary tuple content value, use the first flow log entry to create a first compressed flow log entry that includes the first primary tuple symbol, include the first compressed flow log entry in the compressed flow log, and transmit the compressed flow log to a flow log consumer, wherein the primary tuple definition indicates a first subset of the flow log fields.

In some implementations of the methods and devices, the compressed flow log includes a second compressed flow log entry based on a second flow log entry, and the second compressed flow log entry includes the first primary tuple symbol. In some implementations of the methods and devices, a second primary tuple content value is based on the primary tuple definition and the field values of a second flow log entry that is one of the flow log entries, a second primary tuple symbol is associated with the second primary tuple content value, and the compressed flow log includes a second compressed flow log entry that includes the second primary tuple symbol. In some implementations of the methods and devices, a first secondary tuple content value is based on a secondary tuple definition and the field values of the first flow log entry, a first secondary tuple symbol is associated with the first secondary tuple content value, a second flow log entry includes the first secondary tuple content value, and the compressed flow log includes a second compressed flow log entry that includes the first secondary tuple symbol.

In some implementations of the methods and devices, the compressed flow log includes an anchor timestamp value and the first compressed flow log entry includes a timestamp offset indicating an amount of time relative to the anchor timestamp value. In some implementations of the methods and devices, the method includes participating in a network traffic flow, wherein a cleanup of the network traffic flow is initiated by a termination requester that sends a termination request to a termination responder, the termination responder is configured to send a termination acknowledgement to the termination requester in response to receiving the termination request, the termination requester is configured to provide a record of the cleanup of the network traffic flow to the flow log consumer, and the termination responder is configured to send no record of the cleanup of the network traffic flow to the flow log consumer after receiving the termination request. In some implementations of the methods and devices, the method includes participating in a network traffic flow that has an initiation source and an initiation destination, determining that the network traffic flow is inactive, and cleaning up the network traffic flow, wherein the initiation destination is configured to provide a record of cleaning up of the network traffic flow to the flow log consumer, and the initiation source is configured to provide no record of cleaning up of the network traffic flow to the flow log consumer.

In some implementations of the methods and devices, the network node is configured to cleanup a second network traffic flow after receiving a second termination request from the second node, the network node is configured to send a second termination acknowledgement in response to the second termination request, the network node is configured to send no record of the cleanup of the second network traffic flow to the flow log consumer after receiving the second termination request. In some implementations of the methods and devices, the network node is configured to perform an inactive flow cleanup of the network traffic flow after determining that the network traffic flow is inactive, the network traffic flow has an initiation source and an initiation destination, the initiation destination is configured to provide a record of the inactive flow cleanup of the network traffic flow to the flow log consumer, and the initiation source is configured to provide no record of the cleanup of the network traffic flow to the flow log consumer. In some implementations of the methods and devices, a first primary tuple content value is based on a primary tuple definition and the field values of a first flow log entry that is one of the flow log entries, a first primary tuple symbol is associated with the first primary tuple content value, a first compressed flow log entry that is based on the first flow log entry and that includes the first primary tuple symbol is included in the compressed flow log, and the primary tuple definition indicates a first subset of the flow log fields.

In some implementations of the methods and devices, the compressed flow log includes a dictionary that associates a plurality of tuple symbols with a plurality of tuple content values. In some implementations of the methods and devices, the network node is configured to participate in a network traffic flow with a second node, initiate a cleanup of the network traffic flow by sending a termination request to the second node, receive a termination acknowledgement sent in response to the termination request, include a record of the cleanup of the network traffic flow in the compressed flow log, cleanup a second network traffic flow after receiving a second termination request from the second node, send a second termination acknowledgement in response to the second termination request, and send no record of the cleanup of the second network traffic flow to the flow log consumer after receiving the second termination request. In some implementations of the methods and devices, the network node is configured to perform an inactive flow cleanup of the network traffic flow after determining that the network traffic flow is inactive, the network traffic flow has an initiation source and an initiation destination, the initiation destination is configured to provide a record of the inactive flow cleanup of the network traffic flow to the flow log consumer, and the initiation source is configured to provide no record of the cleanup of the network traffic flow to the flow log consumer.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
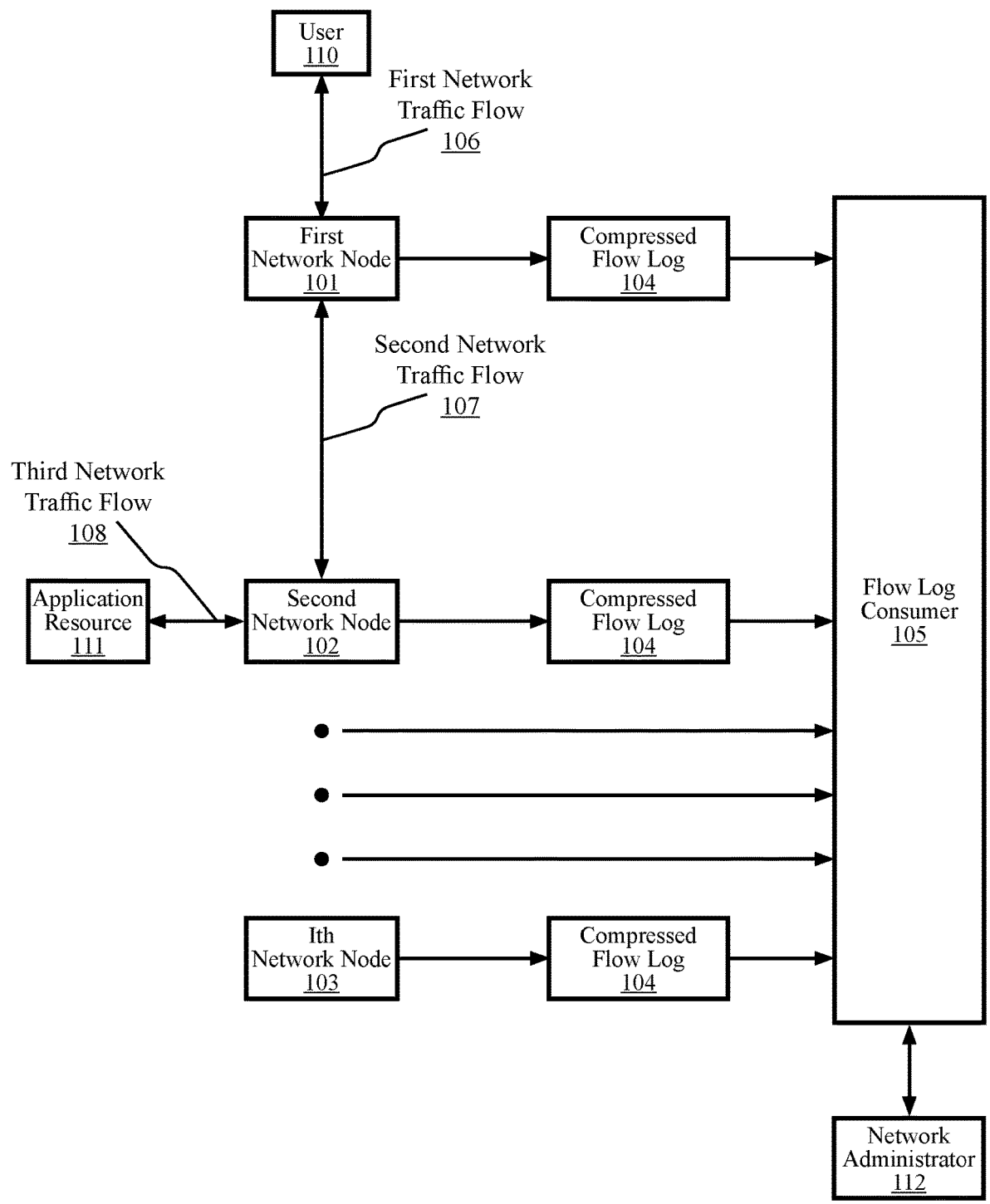
FIG. 1 is a functional block diagram illustrating a flow log consumer receiving compressed flow logs from network appliances according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Cloud vendors provide computing and networking resources for applications implemented by their clients. The networking resources include network appliances, also called nodes or network nodes, such as switches, routers, and network interface cards (NICs). Many cloud vendors support flow logging where the flows that pass through a network appliance are logged based on a logging policy such as log everything, log everything on specific subnets or network interfaces, etc. The flow logs can be periodically sent from the network appliances to flow log consumers for storage and processing. A cloud application can be implemented with tens or hundreds of network appliances and can service billions of traffic flows per day. With many nodes producing flow logs, the processing, transport, and consumption of the flow logs can be large scale and resource intensive. Current trends indicate that network traffic flows are increasing. As such, the volume of flow logs is increasing.

A flow log can record events within a network appliance for the network traffic flows processed by the appliance. The events can include flow creation wherein the network appliance allocates resources for handling the flow, flow deletion or cleanup wherein the network appliance frees the resources allocated for handling the network traffic flow, and update events associated with changes in the state of the network traffic flow. The events can be recorded as flow log entries that have field values for flow log fields such as source internet protocol (IP) address, destination IP address, source port, destination port, event allowed/denied, event type, timestamp, etc. The properties of the flow log entries can be exploited to avoid duplicate flow log entries from being reported by multiple network appliances and to compress repeated field values and groups of field values. The result is that the network appliances produce compressed flow logs.

One advantage of using compressed flow logs is that transporting the flow logs to the flow log consumer requires few resources. Another advantage is that the compressed flow logs require less storage for retaining the flow log information. A related advantage is that flow log information can be retained for a longer period of time before being flushed to make room for new flow log information. Yet another advantage is compressed flow logs can reduce the costs of running a cloud application because the compressed flow logs require fewer resources.

FIG. 1 is a functional block diagram illustrating a flow log consumer 105 receiving compressed flow logs 104 from network appliances 101, 102, 103 according to some aspects. A cloud application can be implemented with numerous network nodes. A first network node 101 may be a load balancer. A second network node 102 may be a network interface card (NIC) in a host computer providing an application resource 111 such as a web server. In another example, the first network node 101 may be a firewall, the second network node 102 a switch, and the third network node an email server.

Regardless of the specific roles of the network nodes and application resources, network traffic flows pass between them. The first network traffic flow 106 is between the user 110 and the first network node 101. The second network traffic flow 107 is between the first network node 101 and the second network node 102. The third network traffic flow 108 is between the second network node 102 and the application resource 111. The first network node 101 can gather flow log entries related to the first network traffic flow 106 and the second network traffic flow 107. The second network node 102 can gather flow log entries related to the second network traffic flow 107 and the third network traffic flow 108. The network nodes 101, 102, 103 can send compressed flow logs 104 to a flow log consumer 105, thereby sharing the flow log entries with the flow log consumer. The flow log consumer 105 may store the compressed flow logs and may process the compressed flow logs to help provide insights to a network administrator 112.

Figure 2:
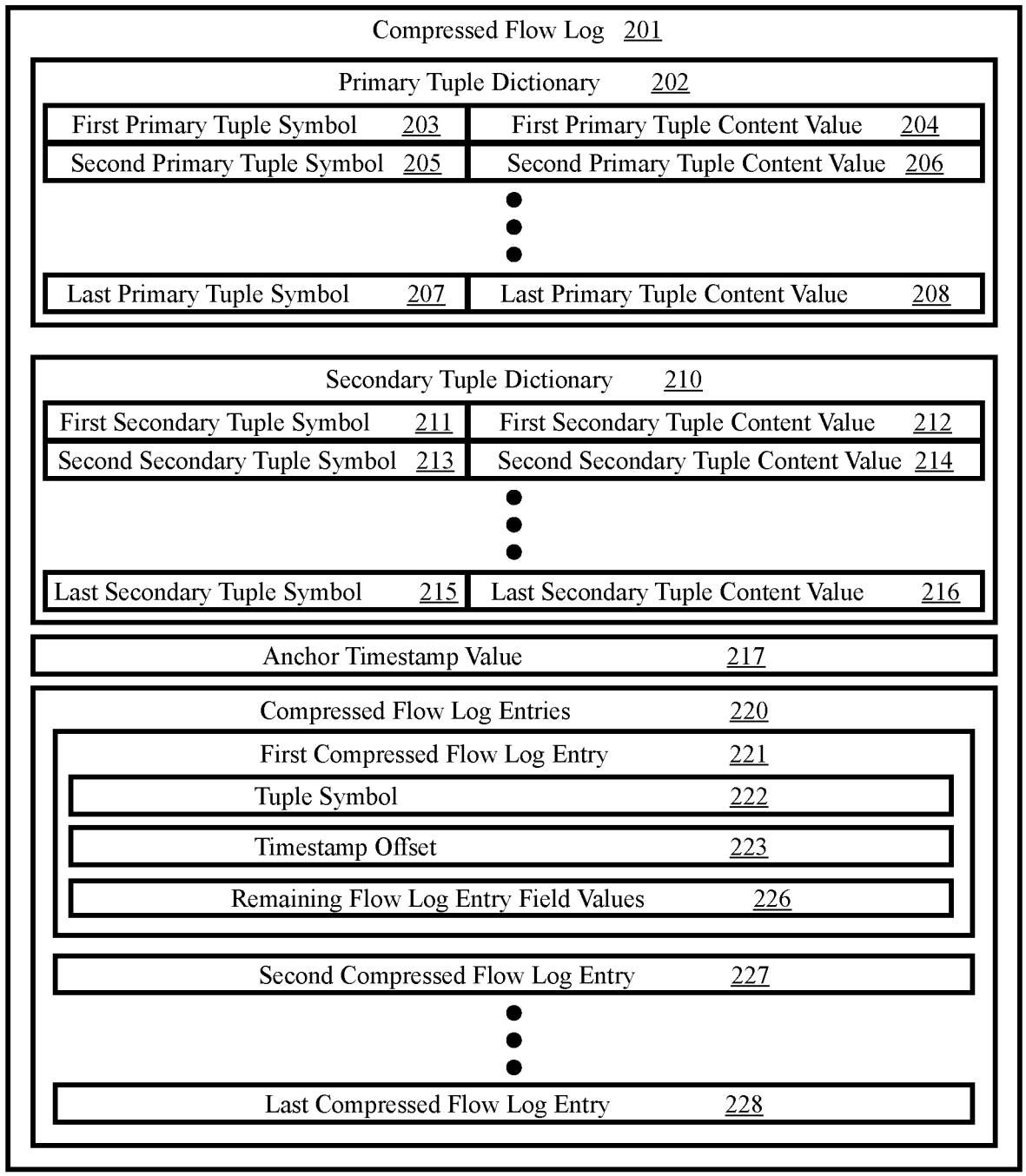
FIG. 2 is a diagram illustrating a non-limiting example of a compressed flow log according to some aspects.

FIG. 2 is a diagram illustrating a non-limiting example of a compressed flow log 201 according to some aspects. A compressed flow log can include one or more tuple dictionaries such as primary tuple dictionary and secondary tuple dictionary 210. The compressed flow log can also include an anchor timestamp value 217 and compressed flow log entries 220. A tuple dictionary can include one or more symbol/content pairs. The content can be a set of field values that, in a log entry, is many bits long (e.g., 96-bits). The associated symbol can use a small number of bits (e.g., 7-bits) to represent that set of field values. In the primary tuple dictionary 202, the first primary tuple symbol 203 is paired with the first primary tuple content value 204, the second primary tuple symbol 205 is paired with the second primary tuple content value 206, and the last primary tuple symbol 207 is paired with the last primary tuple content value 208. In the secondary tuple dictionary 210, the first secondary tuple symbol 211 is paired with the first secondary tuple content value 212, the second secondary tuple symbol 213 is paired with the second secondary tuple content value 214, and the last secondary tuple symbol 215 is paired with the last secondary tuple content value 216.

The compressed flow log entries 220 can include a first compressed flow log entry 221, a second compressed flow log entry 227, and a last compressed flow log entry 228. Contents of the first compressed flow log entry 221 are illustrated as an example. The first compressed flow log entry 221 can include a tuple symbol 222, a timestamp offset 223, and remaining flow log entry field values 226. For example, a flow log entry may have a total of seven flow log fields (including timestamp) and the tuple symbol may be associated (via one of the dictionaries) with values for four of the flow log fields. The compressed flow log entry may therefore include the tuple symbol (indicates four field values), the timestamp offset (indicates one field value), and the two remaining flow log entries. The timestamp offset 223 may be, for example, 5-bits indicating a number of seconds to add to the anchor timestamp value 217 to thereby determine the timestamp of the flow log entry. The remaining flow log entry field values may be represented unchanged from the format in which they are in the flow log entry or may be compressed using a compression algorithm such as Huffman coding, etc.

The example of FIG. 2 uses two tuple dictionaries. Alternatively, more or fewer tuple dictionaries may be used. The tuple definitions are not shown in the compressed flow log although some embodiments may include tuple definitions in one, some, or all compressed flow logs. The tuple definitions can be shared by network nodes sending tuple definitions to the flow log consumer, the flow log consumer sending tuple definitions to the network nodes, or both. A network administrator may create the tuple definitions.

Figure 3:
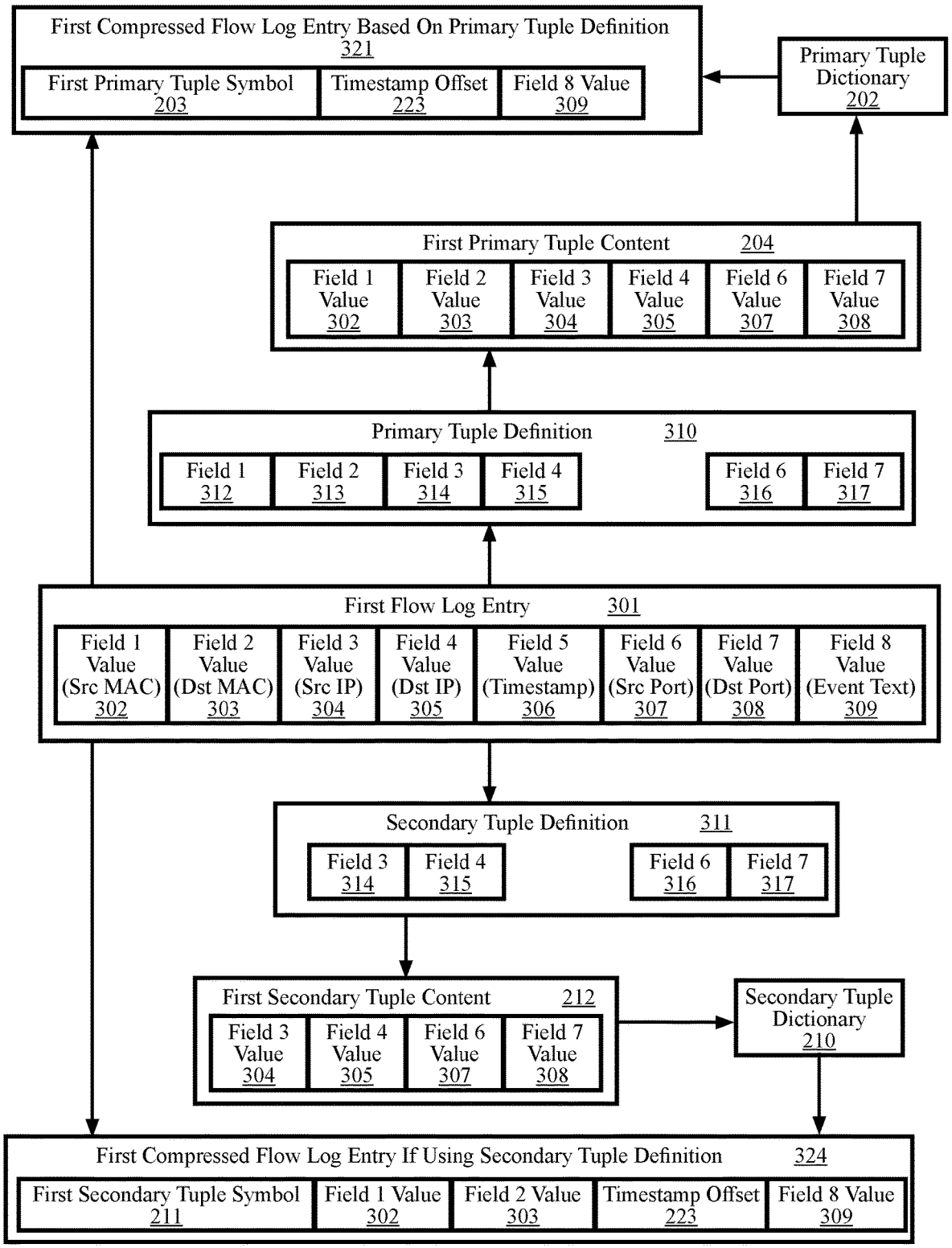
FIG. 3 is a high-level block diagram illustrating tuple content values that are determined based on tuple definitions and on the field values of flow log fields in a flow log entry according to some aspects.

FIG. 3 is a high-level block diagram illustrating tuple content values that are determined based on tuple definitions and on the field values of flow log fields in a flow log entry according to some aspects. The first flow log entry 301 is an example of the flow log entries that may be gathered by a network appliance or node. The flow log fields of the flow log entries can include a source media access identifier (MAC) in the first field, a destination MAC in the second field, a source IP address in the third field, a destination IP address in the fourth field, a timestamp in the fifth field, a source port number in the sixth field, a destination port number in the seventh field, and event text in the eighth field. As such, the first flow log entry 301 can have a flow's source MAC as the first field value 302, the flow's destination MAC as the second field value 303, the flow's source IP address as the third field value 304, the flow's destination IP address as the fourth field value 305, the flow's timestamp as the fifth field value 306, the flow's source port number as the sixth field value 307, the flow's destination port number as the seventh field value 308, and event text for the flow as the eighth field value 309.

The primary tuple definition 310 specifies that the primary tuple content includes field values for the first field 312, the second field 313, the third field 314, the fourth field 315, the sixth field 316, and the seventh field 317. The first primary tuple content value 204 is based on the primary tuple definition 310 and the first flow log entry 301. As such, the first primary tuple content value 204 includes the first field value 302 (the flow's source MAC), the second field value 303 (the flow's destination MAC), the third field value 304 (the flow's source IP address), the fourth field value 305 (the flow's destination IP address), the sixth field value 307 (the flow's source port number), and the seventh field value 308 (the flow's destination port number). The primary tuple dictionary 202 can store the first primary tuple content value 204 in association with the first primary tuple symbol 203. The first compressed flow log entry based on the primary tuple definition 321 includes the first primary tuple symbol 203, the timestamp offset 223, and the eighth field value 309 (event text for the flow).

The secondary tuple definition 311 specifies that the secondary tuple content includes field values for the third field 314, the fourth field 315, the sixth field 316, and the seventh field 317. The first secondary tuple content value 212 is based on the secondary tuple definition 311 and the first flow log entry 301. As such, the first secondary tuple content value 212 includes the third field value 304 (the flow's source IP address), the fourth field value 305 (the flow's destination IP address), the sixth field value 307 (the flow's source port number), and the seventh field value 308 (the flow's destination port number). The secondary tuple dictionary 210 can store the first secondary tuple content value 212 in association with the first secondary tuple symbol 211. The first compressed flow log entry based on the secondary tuple definition 324 includes the first secondary tuple symbol 211, the first field value 302 (the flow's source MAC), the second field value 303 (the flow's destination MAC), the timestamp offset 223, and the eighth field value 309 (event text for the flow).

The example of FIG. 3 is primarily illustrative to show the use of tuple definitions in producing tuple content values from flow entries. In practice, the dictionaries within a compressed flow log are unlikely to include an entry that is not used. For example, a secondary tuple dictionary entry for the first secondary tuple content value may never be needed if the first primary tuple symbol is used for compressing the first flow log entry 301 and there are no other compressed flow log entries that need the first secondary tuple content value. If it is not needed for decompressing any compressed flow log entry in the compressed flow log, there may be no dictionary entry for the first secondary tuple content value in the second tuple dictionary.

Figure 4:
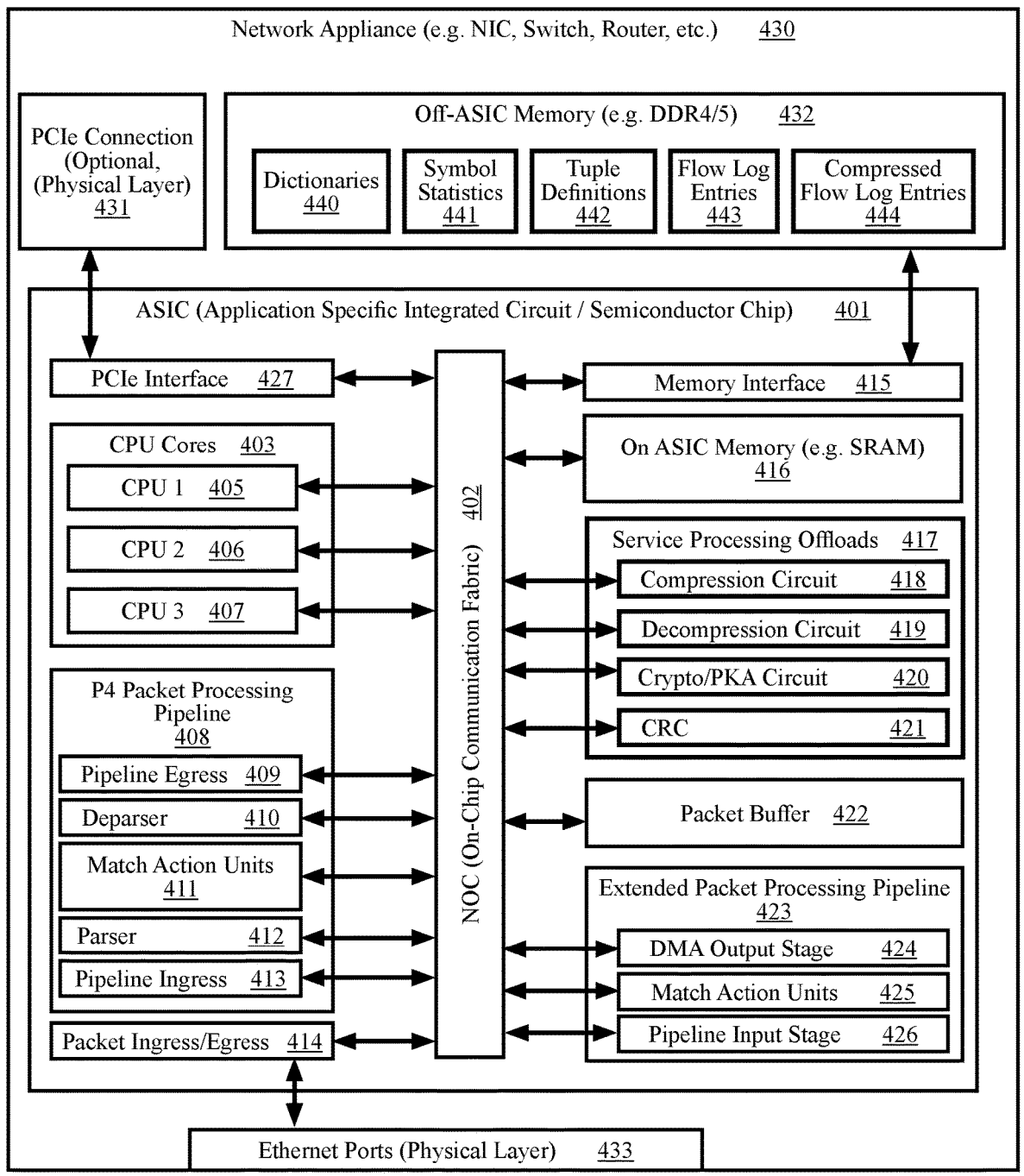
FIG. 4 is a functional block diagram of a network appliance such as a network interface card (NIC) or a network switch having an application specific integrated circuit (ASIC), according to some aspects.

FIG. 4 is a functional block diagram of a network appliance 430 such as a network interface card (NIC) or a network switch having an application specific integrated circuit (ASIC) 401, according to some aspects. A network appliance that is a NIC includes a peripheral component interconnect express (PCIe) connection 431 and can be installed in a host computer. A NIC can provide network services to the host computer and to virtual machines (VMs) running on the host computer. The network appliance 430 includes an off-ASIC memory 432, and ethernet ports 433. The off-ASIC memory 432 can be one of the widely available memory modules or chips such as DDR4 SDRAM modules such that the ASIC has access to many gigabytes of memory. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used advanced extensible interface (AXI) bus. The ASIC's core circuits can include a PCIe interface 427, central processing unit (CPU) cores 403, P4 packet processing pipeline 408 elements, memory interface 415, on ASIC memory (e.g., SRAM) 416, service processing offloads 417, a packet buffer 422, extended packet processing pipeline 423, and packet ingress/egress circuits 414. A PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniBand channel adapter, of an NVMe card, and of a network appliance that processes network traffic flows carried by IP (internet protocol) packets.

The P4 packet processing pipeline 408 is a specialized set of elements for processing network packets such as IP packets, NVMe protocol data units (PDUs), and InfiniBand PDUs. The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is defined in the "P416 Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including network switches, network routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system. The memory 432 can also be used to store dictionaries 440, symbol table statistics 441, tuple definitions 442, flow log entries 443, and compressed flow log entries 444. The dictionaries 440 can include tuple tracking dictionaries, discussed below, as well as tuple dictionaries such as a primary tuple dictionary 202 and a secondary tuple dictionary 210. Symbol statistics can include statistics related tuple content values such as the number of times a tuple having specific values appears in the flow log entries 443.

The CPU cores 403 can be general purpose processor cores, such as reduced instruction set computing (RISC) processor cores, advanced RISC machine (ARM) processor cores, microprocessor without interlocked pipelined stages (MIPS) processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408, 423.

The packet processing circuitry 408, 423 can be a specialized circuit or part of a specialized circuit implementing programmable packet processing pipelines. Some embodiments include a P4 pipeline as a fast data path within the network appliance. The fast data path is called the fast data path because it processes packets faster than a slow data path that can also be implemented within the network appliance. An example of a slow data path is a software implemented data path wherein the CPU cores 403 zand memory 432 are configured via software to implement a slow data path.

The ASIC 401 is illustrated with a P4 packet processing pipeline 408 and an extended packet processing pipeline 423. The extended packet processing pipeline is a packet processing pipeline that has a direct memory access (DMA) output stage 424. The extended packet processing pipeline has match-action units 425 that can be arranged as a match-action pipeline. The extended packet processing pipeline has a pipeline input stage 426 that can receive packet header vectors (PHVs) or directives to perform operations. A PHV can contain data parsed from the header and body of a network packet by the parser 412.

All memory transactions in the NIC 430, including host memory transactions, on board memory transactions, and registers reads/writes may be performed via a coherent interconnect 402. In one non-limiting example, the coherent interconnect can be provided by a network on a chip (NOC) "IP core" (in this one context, "IP" is an acronym for intellectual property). Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, 423, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
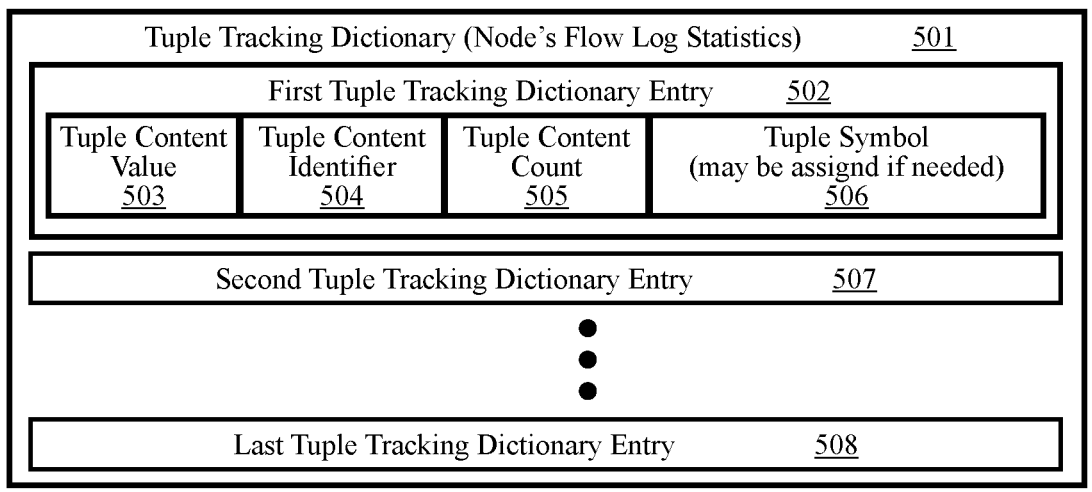
FIG. 5 illustrates a tuple tracking dictionary according to some aspects.

FIG. 5 illustrates a tuple tracking dictionary 501 according to some aspects. The tuple tracking dictionary includes tuple tracking dictionary entries such as the first tuple tracking dictionary entry 502, the second tuple tracking dictionary entry 507, and the last first tuple tracking dictionary entry 508. A tuple tracking dictionary entry can include a tuple content value 503, a tuple content identifier 504, a tuple content count 505, and a tuple symbol 506. Referring to FIG. 2, the first primary tuple content value 204 and the first secondary tuple content value 212 are examples of the tuple content values. A tuple content identifier 504 may be used to uniquely identify a specific tuple content value 503 or the tuple tracking dictionary entry for the specific tuple content value 503. A tuple tracking dictionary implemented as a list of entries can use indexes into the list as tuple content identifiers. A tuple tracking dictionary implemented using key value pairs can use the tuple content value as a key and the tuple content identifier can be a hash value computed using the tuple content value. Programming languages such as Python implement key-value pair dictionaries that make internal use of hashes of the keys. The tuple content count 505 indicates the number of time flow log entries having field values matching the tuple content value 503. The first primary tuple symbol 203 and the first secondary tuple symbol 211 are examples of the tuple symbol 506. In practice, tuple symbols may be assigned to tuple content values when the compressed flow log is being assembled and after the flow log statistics are gathered.

Figure 6:
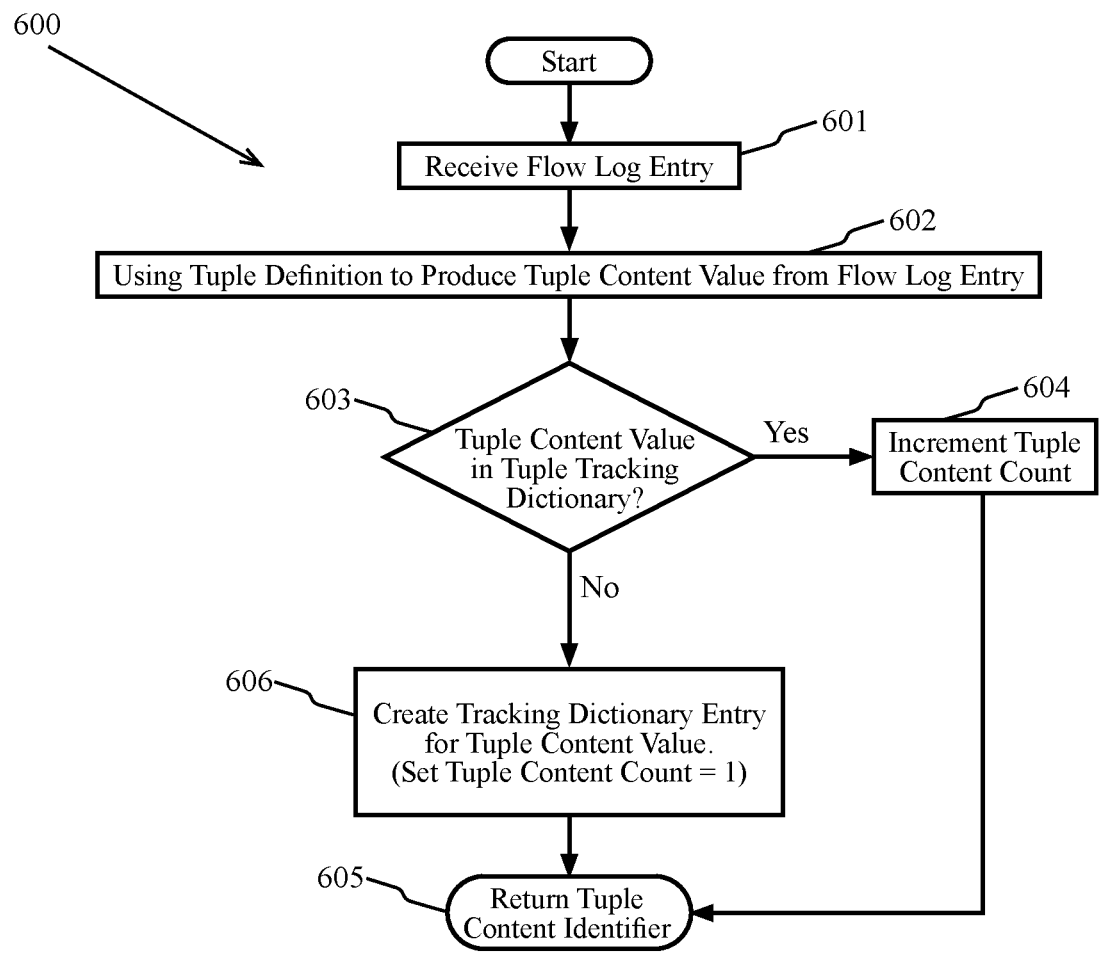
FIG. 6 is a high-level flow diagram illustrating the processing of incoming flow log entries to maintain a tuple tracking dictionary according to some aspects.

FIG. 6 is a high-level flow diagram illustrating the processing of incoming flow log entries to maintain a tuple tracking dictionary 600 according to some aspects. After the start, at block 601 a flow log entry is received. At block 602, the tuple definition is used to produce a tuple content value from the flow log entry. The tuple definition used can be a tuple definition associated with the tuple tracking dictionary. For example, the primary tuple definition 310 can be associated with a tuple tracking dictionary that is used to gather statistics for tuple content values produced using the primary tuple definition. At block 603, the process checks if the tuple content value is already in the tuple tracking dictionary. If it is, then at block 604 the tuple content count for the tuple content value is incremented. Otherwise, at block 606 a tracking dictionary entry having a tuple content count of one is created for the tuple content value. At block 605, the process returns the tuple content identifier for the tuple content value. Some implementations may return without returning the tuple content identifier.

Figure 7:
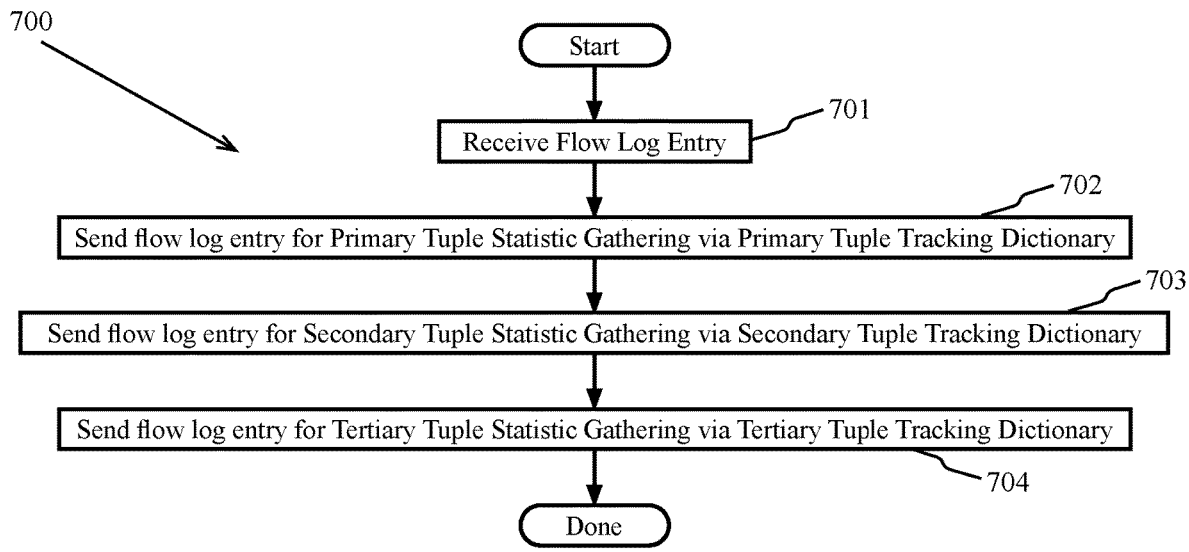
FIG. 7 is a high-level flow diagram illustrating a process for maintaining numerous tuple tracking dictionaries according to some aspects.

FIG. 7 is a high-level flow diagram illustrating a process for maintaining numerous tuple tracking dictionaries 700 according to some aspects. After the start, at block 701 a flow log entry is received. At block 702, the flow log entry is sent for primary tuple statistics gathering via the primary tuple tracking dictionary. The task of block 702 can be accomplished by sending the flow log entry to the process of FIG. 6 wherein the tracking dictionary of FIG. 6 is the primary tuple tracking dictionary and the tuple definition of FIG. 6 is the primary tuple definition. At block 703, the flow log entry is sent for secondary tuple statistics gathering via the secondary tuple tracking dictionary. The task of block 703 can be accomplished by sending the flow log entry to the process of FIG. 6 wherein the tracking dictionary of FIG. 6 is the secondary tuple tracking dictionary and the tuple definition of FIG. 6 is the secondary tuple definition. At block 704, the flow log entry is sent for tertiary tuple statistics gathering via the tertiary tuple tracking dictionary. The task of block 704 can be accomplished by sending the flow log entry to the process of FIG. 6 wherein the tracking dictionary of FIG. 6 is the tertiary tuple tracking dictionary and the tuple definition of FIG. 6 is the tertiary tuple definition. Here, three tracking dictionaries are maintained. Alternatively, more or fewer tracking dictionaries may be maintained.

Figure 8:
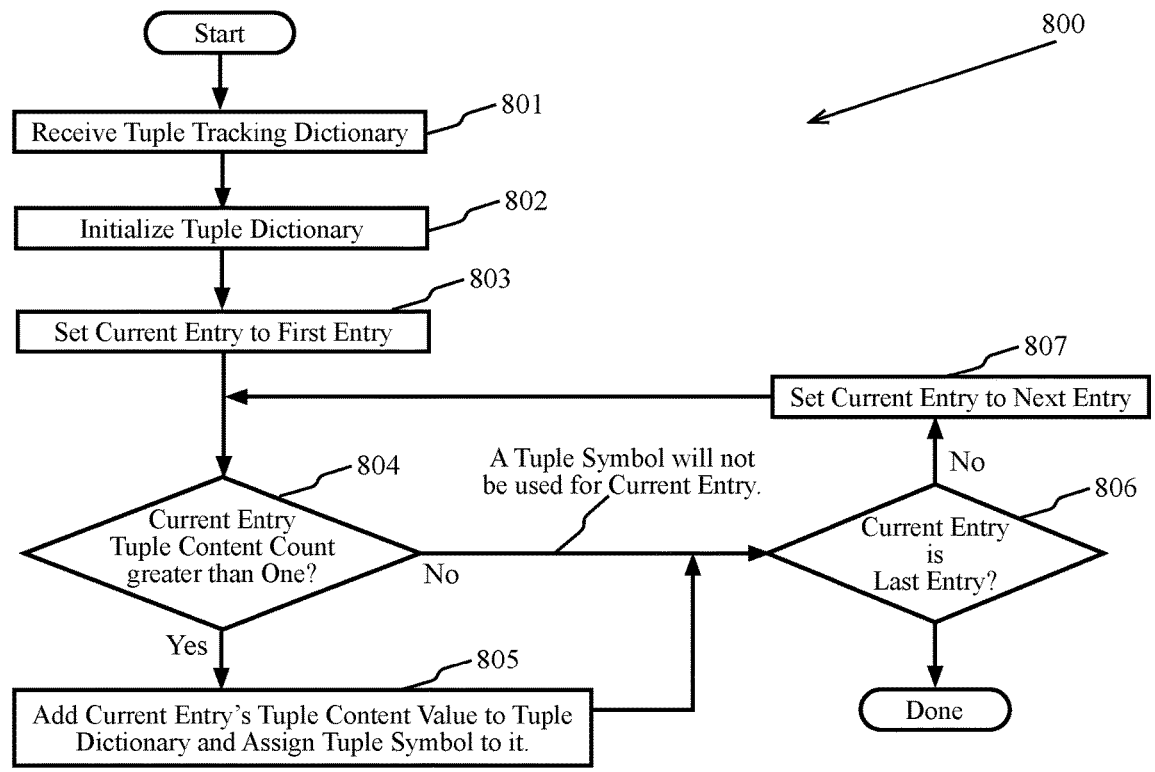
FIG. 8 is a high-level flow diagram illustrating assembling a tuple dictionary for use with and inclusion in a compressed flow log according to some aspects.

FIG. 8 is a high-level flow diagram illustrating assembling a tuple dictionary for use with and inclusion in a compressed flow log 800 according to some aspects. Before the start, the tuple statistic gathering may have already been performed using a process such as that of FIG. 6 or FIG. 7. After the start, at block 801 a tuple tracking dictionary is received. At block 802, a tuple dictionary is initialized. At block 803, the current entry is set to the first entry of the tuple tracking dictionary. At block 804 the process determines if the current entry's tuple content count is greater than one. If so, at block 805 the process adds the current entry's tuple content value to the tuple dictionary and assigns a tuple symbol to the current entry's tuple content value before continuing to block 806. Otherwise, the process continues directly to block 806, (a tuple symbol will not be used for the tuple content value of the current entry). At block 806, the process determines if the current entry is the last entry in the tuple tracking dictionary. If so, the process is done. Otherwise, at block 807 the current entry is set to the next entry in the tuple tracking dictionary before the process loops back to block 804.

Figure 9:
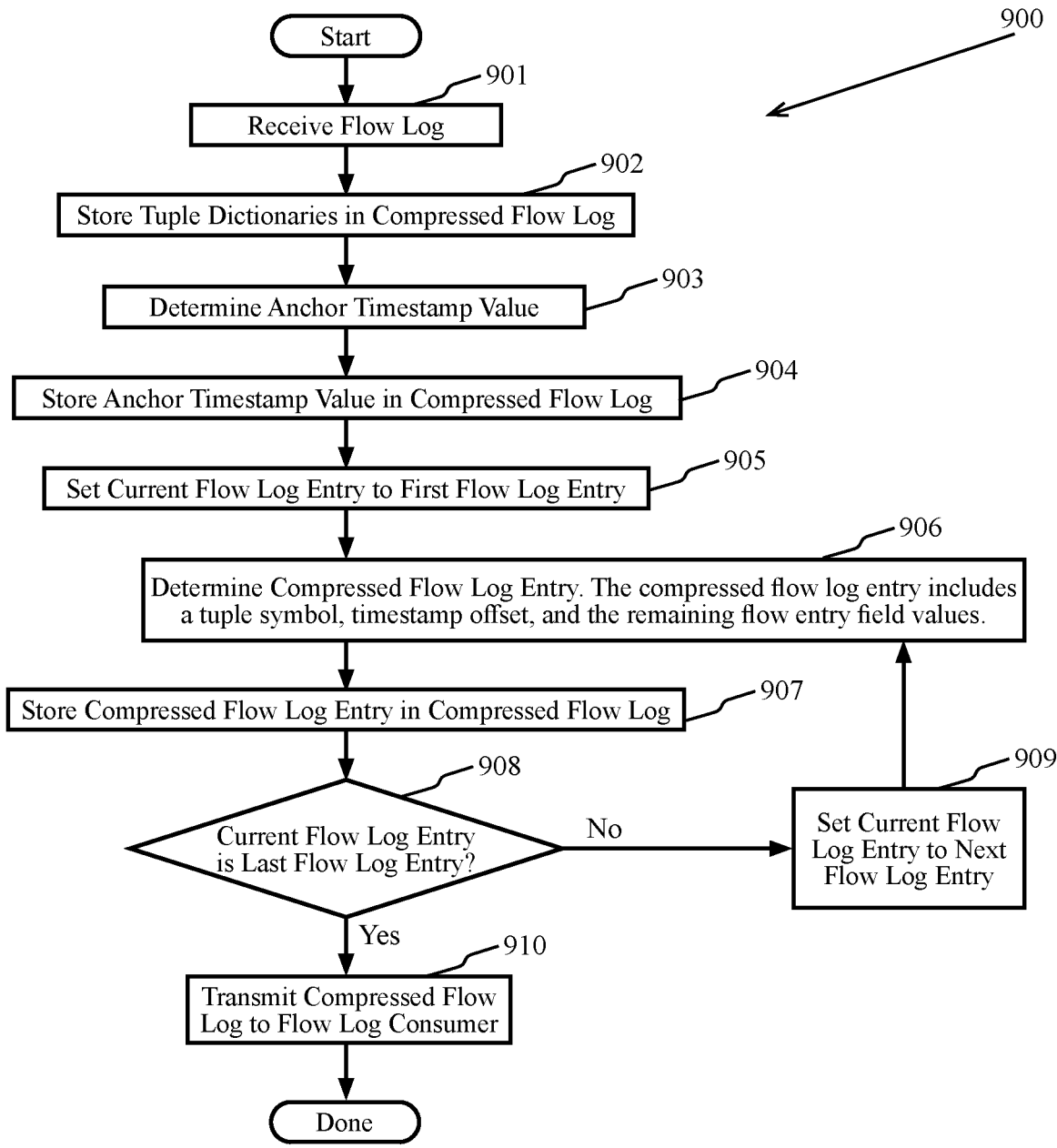
FIG. 9 is a high-level flow diagram illustrating assembling a compressed flow log according to some aspects.

FIG. 9 is a high-level flow diagram illustrating assembling a compressed flow log 900 according to some aspects. Before the start, the tuple dictionaries may have been produced via a process such as that of FIG. 8. After the start, at block 901 a flow log is received. At block 902, the tuple dictionaries are stored in the compressed flow log. At block 903, the anchor timestamp value is determined. At block 904, the anchor timestamp is stored in the compressed flow log. At block 905, the current flow log entry is set to the first flow log entry in the flow log. At block 906, the compressed flow log entry is determined. The compressed flow log entry includes a tuple symbol, timestamp offset, and remaining flow log entry field values. At block 907, the compressed flow log entry is stored in the compressed flow log. At block 908, the process determines if the current flow log entry is the last flow log entry. If not, then at block 909 the current flow log entry is set to the next flow log entry before the process loops back to block 906. Otherwise, at block 910 the compressed flow log is transmitted to the flow log consumer before the process is done. At this point, the dictionaries may be discarded. The dictionaries may optionally be reset, or initialized in anticipation of creating another compressed flow log file.

Figure 10:
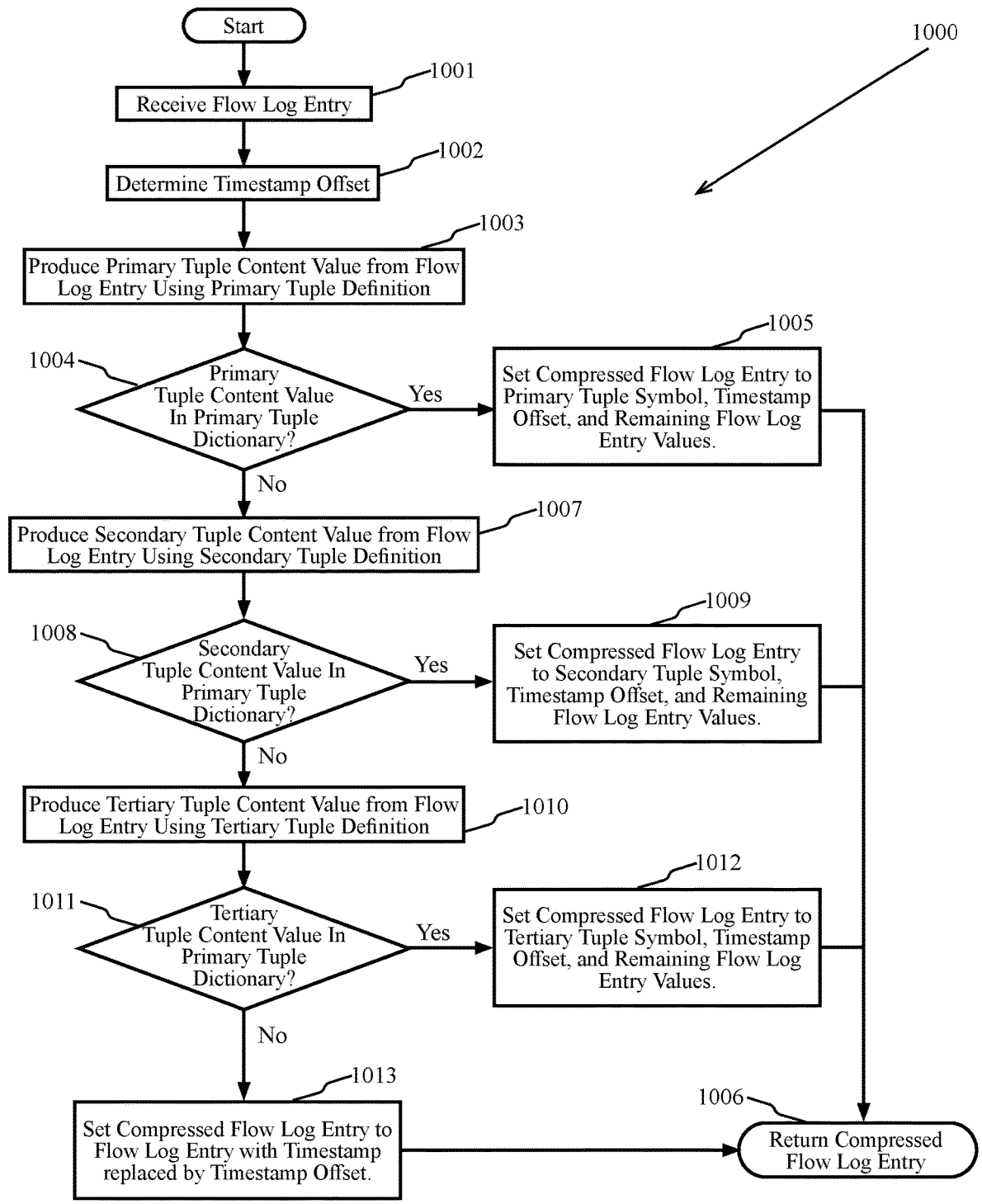
FIG. 10 is a high-level flow diagram illustrating determining compressed flow log entries for inclusion in a compressed flow log according to some aspects.

FIG. 10 is a high-level flow diagram illustrating determining compressed flow log entries for inclusion in a compressed flow log 1000 according to some aspects. The process of FIG. 10 may perform the task of block 906 of FIG. 9. After the start, at block 1001 a flow log entry is received. At block 1002, the timestamp offset is determined (e.g., subtract anchor timestamp from flow log entry's timestamp).

At block 1003, the flow log entry and the primary tuple definition are used to produce a primary tuple value. At block 1004, the process checks for the primary tuple value in the primary tuple dictionary. If the primary tuple value is in the primary tuple dictionary, then at block 1005 the compressed flow log entry is set to the primary tuple symbol, the timestamp offset, and the remaining flow log entry values before the compressed flow log entry is returned at block 1006. The primary tuple symbol is the symbol associated with the primary tuple content value by the primary tuple dictionary. The remaining flow log entry values are the values for the fields that are not included in the primary tuple definition. If the primary tuple value is not in the primary tuple dictionary, the process continues to block 1007.

At block 1007, the flow log entry and the secondary tuple definition are used to produce a secondary tuple value. At block 1008, the process checks for the secondary tuple value in the secondary tuple dictionary. If the secondary tuple value is in the secondary tuple dictionary, then at block 1009 the compressed flow log entry is set to the secondary tuple symbol, the timestamp offset, and the remaining flow log entry values before the compressed flow log entry is returned at block 1006. The secondary tuple symbol is the symbol associated with the secondary tuple content value by the secondary tuple dictionary. The remaining flow log entry values are the values for the fields that are not included in the secondary tuple definition. If the secondary tuple value is not in the secondary tuple dictionary, the process continues to block 1010.

At block 1010, the flow log entry and the tertiary tuple definition are used to produce a tertiary tuple value. At block 1011, the process checks for the tertiary tuple value in the tertiary tuple dictionary. If the tertiary tuple value is in the tertiary tuple dictionary, then at block 1012 the compressed flow log entry is set to the tertiary tuple symbol, the timestamp offset, and the remaining flow log entry values before the compressed flow log entry is returned at block 1006. The tertiary tuple symbol is the symbol associated with the tertiary tuple content value by the tertiary tuple dictionary. The remaining flow log entry values are the values for the fields that are not included in the tertiary tuple definition. If the tertiary tuple value is not in the tertiary tuple dictionary, then at block 1013 the process sets the compressed flow log entry to the flow log entry with the timestamp replaced by the timestamp offset before continuing to block 1006.

Figure 11:
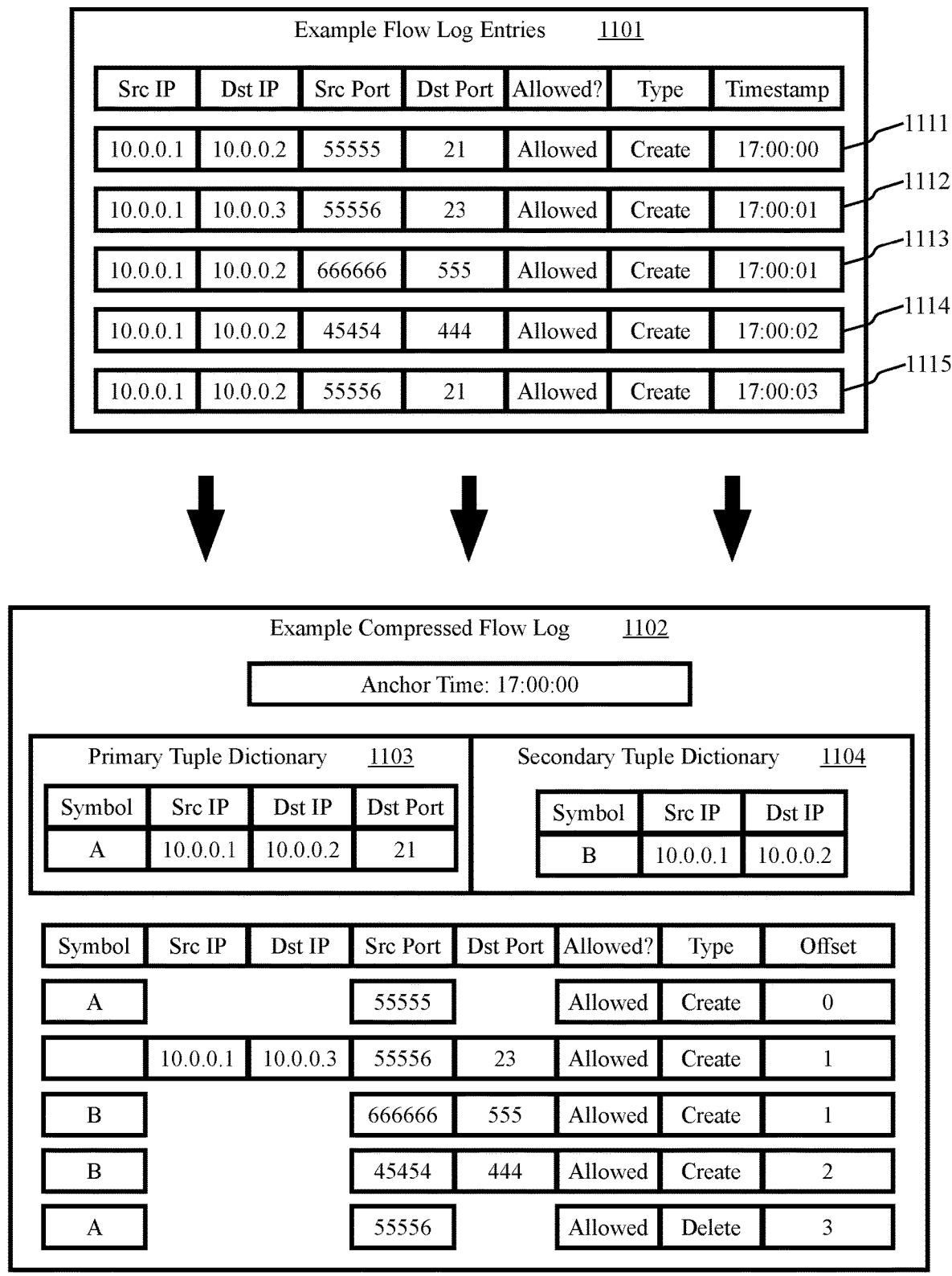
FIG. 11 illustrates a high-level diagram illustrating non-limiting examples of compressing flow log entries to produce compressed flow log entries in a compressed flow log according to some aspects.

FIG. 11 illustrates a high-level diagram illustrating non-limiting examples of compressing flow log entries to produce compressed flow log entries in a compressed flow log according to some aspects. The example flow log entries 1101 are five flow log entries that may be compressed into compressed flow log entries in the example compressed flow log 1102. The anchor time is the earliest timestamp value in all the flow log entries. The primary tuple definition is {Src IP, Dst IP, Dst Port}. The secondary tuple definition is {Src IP, Dst IP}. The primary tuple dictionary 1103 has one entry that associates the symbol "A" with the primary tuple content value {Src IP=10.0.0.1; Dst IP=10.0.0.2; Dst Port=21}. The secondary tuple dictionary 1104 has one entry that associates the symbol "B" with the secondary tuple content value {Src IP=10.0.0.1; Dst IP=10.0.0.2}. Greater compression is realized using the primary tuple definition because it includes more fields. As such, the primary dictionary is consulted first for matching tuple content values.

The primary content value determined using the primary tuple definition and the first entry 1111 is the same as that for "A". As such, the first entry 1111 is compressed to {A, 55555, Allowed, Create, 0}. The primary content value determined using the primary tuple definition and the second entry 1112 is not in the primary tuple dictionary, as such the secondary tuple dictionary is checked. The secondary content value determined using the secondary tuple definition and the second entry 1112 is not in the secondary tuple dictionary. The second entry is therefore not compressed except for the timestamp being replaced by the timestamp offset "1". The primary content value determined using the primary tuple definition and the third entry 1113 is not in the primary tuple dictionary, as such the secondary tuple dictionary is checked. The secondary content value determined using the secondary tuple definition and the third entry 1113 is the same as that for "B". As such, the third entry 1113 is compressed to {B, 666666, 555, Allowed, Create, 1}. The primary content value determined using the primary tuple definition and the fourth entry 1114 is not in the primary tuple dictionary, as such the secondary tuple dictionary is checked. The secondary content value determined using the secondary tuple definition and the fourth entry 1114 is the same as that for "B". As such, the fourth entry 1114 is compressed to {B, 45454, 444, Allowed, Create, 2}. The primary content value determined using the primary tuple definition and the fifth entry 1115 is the same as that for "A". As such, the fifth entry 1115 is compressed to {A, 55556, Allowed, Delete, 3}.

The amount of data in the flow logs can be reduced when a network traffic flow passes between two network nodes and both network nodes are sending flow logs to a log consumer. Such a situation is illustrated in FIG. 1 wherein the second network traffic flow 107 is between the first network node 101 and the second network node 102. In such a situation, the nodes can coordinate such that one of the nodes does not report certain events. As such, the flow log consumer does not receive two log entries for the same event. This may be called deduplication. The reporting of network traffic flow cleanups can be deduplicated. A node can cleanup a network traffic flow by freeing up the resources the node has dedicated to processing that network traffic flow. The default behavior of each node can be to create a record of every cleanup. The records of the recorded cleanups can be included in flow logs or compressed flow logs that are sent to the flow log consumer.

Figure 12:
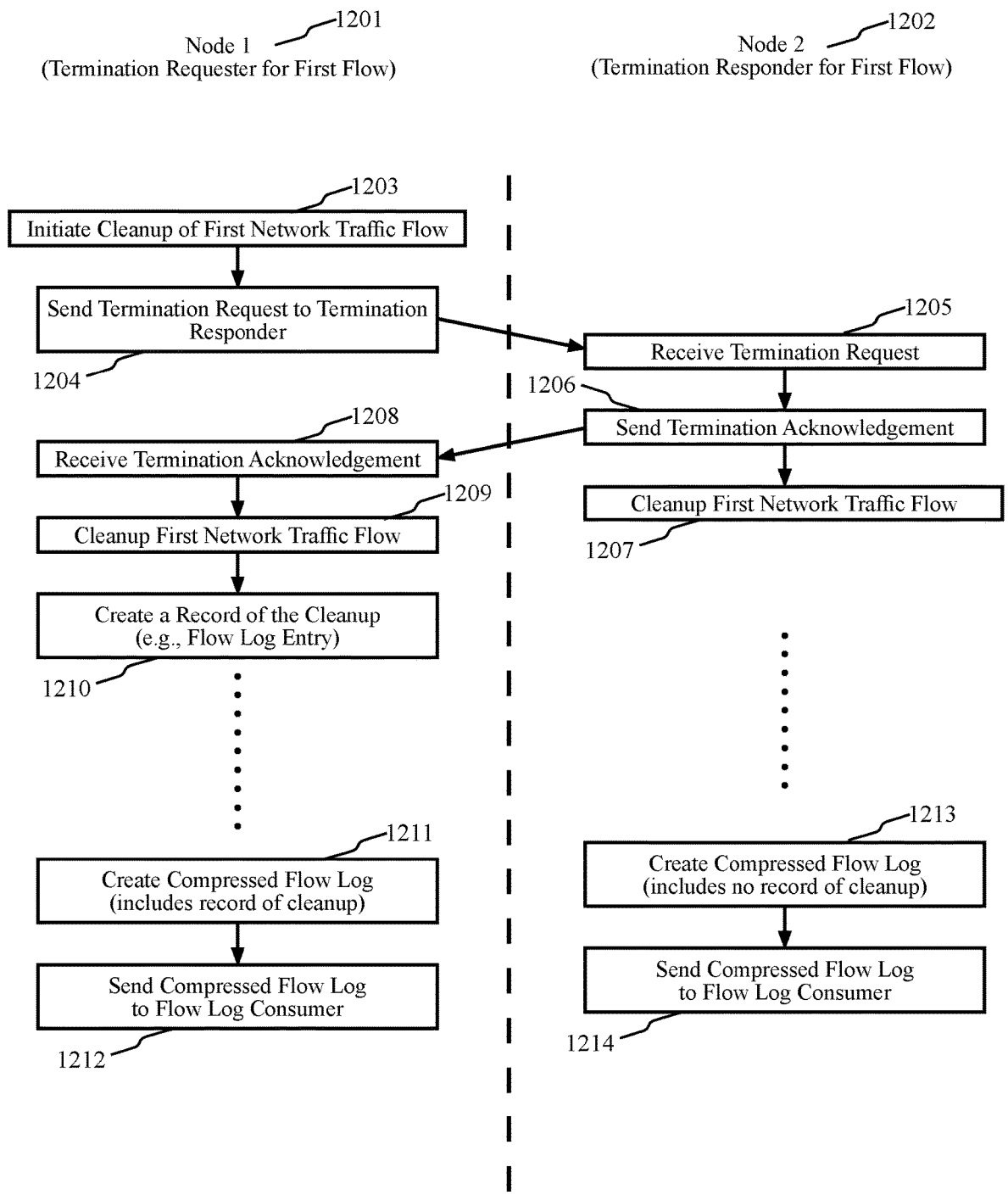
FIG. 12 illustrates a high-level flow diagram illustrating nodes coordinating the reporting of a record of a cleanup according to some aspects.

FIG. 12 illustrates a high-level flow diagram illustrating nodes coordinating the reporting of a record of a cleanup according to some aspects. The nodes are configured to create records of flow cleanups with the exception that a record of cleaning up a flow is not created by a node after the node has received a termination request for that flow. A first network traffic flow has been established between a first node 1201 and a second node 1202. Having fulfilled its purpose, the first network traffic flow is to be terminated (e.g., a TCP connection is being closed). At block 1203, the first node initiates a cleanup of the first network traffic flow. At block 1204, the first node sends a termination request for the first network traffic flow to the second node. As such, for the first network traffic flow the first node is the termination requester and the second node is the termination responder. At block 1205, the second node receives the termination request (e.g., TCP FIN packet). In response, at block 1206 the second node sends a termination response (e.g., TCP FIN ACK) for the first network traffic flow. At block 1207, the second node performs a cleanup of the first network traffic flow. No record of the cleanup is created by the second node because the second node received a termination request for the first network traffic flow. At block 1208, the first node receives the termination acknowledgement. At block 1209, the first node performs a cleanup of the flow. At block 1210, the first node creates a record of the cleanup of the first network traffic flow. At block 1211, the first node creates a compressed flow log and, at block 1212 sends the compressed flow log to the flow log consumer. At block 1213, the second node creates a compressed flow log and, at block 1214 sends the compressed flow log to the flow log consumer. The compressed flow log from the first node includes a record of the cleanup of the first network flow. The second node does not include a record of the cleanup of the first network flow in a compressed flow log.

Figure 13:
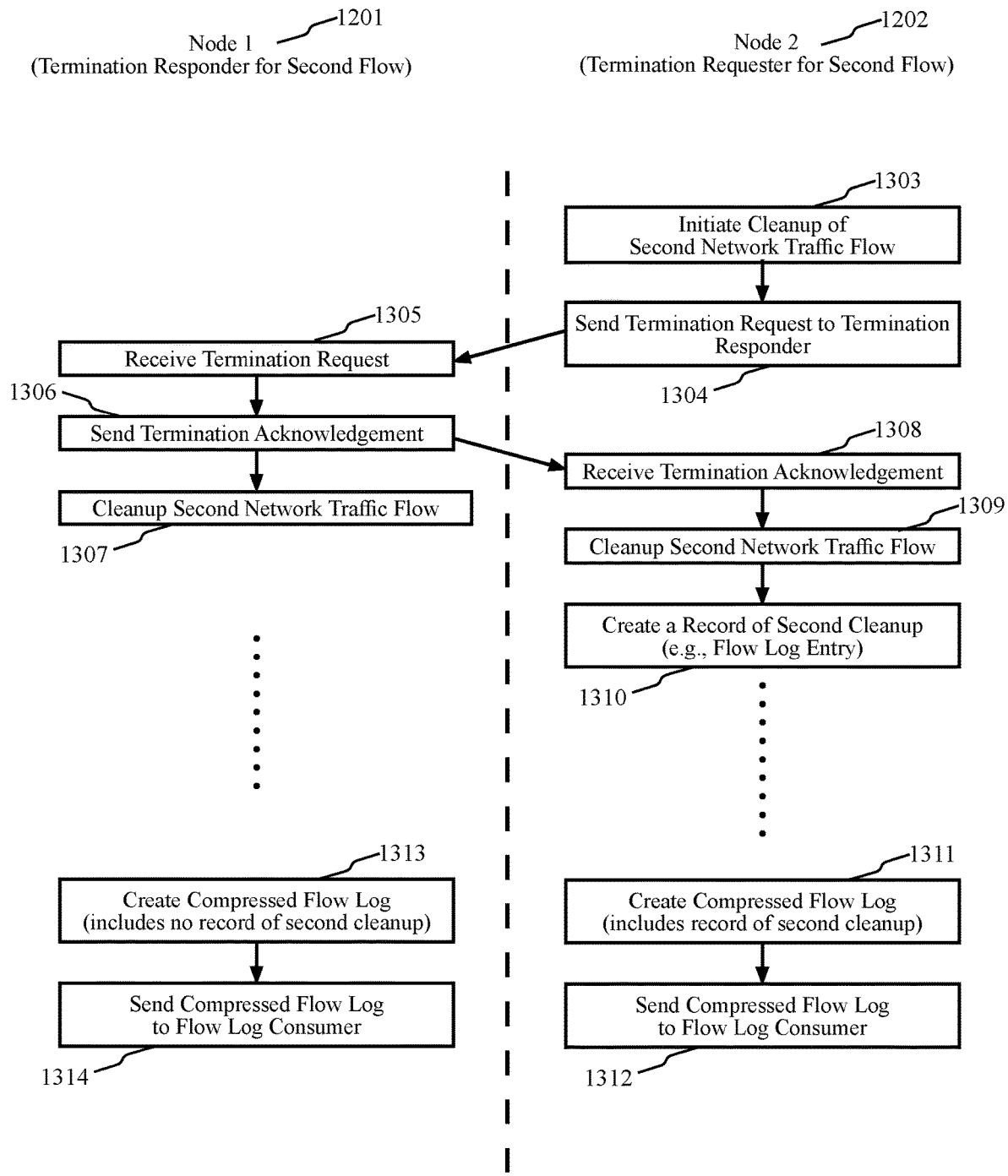
FIG. 13 illustrates a high-level flow diagram illustrating nodes coordinating the reporting of a record of a second cleanup according to some aspects.

FIG. 13 illustrates a high-level flow diagram illustrating nodes coordinating the reporting of a record of a second cleanup according to some aspects. A second network traffic flow has been established between the first node 1201 and the second node 1202. Having fulfilled its purpose, the second network traffic flow is to be terminated (e.g., a TCP connection is being closed). At block 1303, the second node initiates a cleanup of the second network traffic flow. At block 1304, the second node sends a termination request for the second network traffic flow to the first node. As such, for the second network traffic flow the second node is the termination requester and the first node is the termination responder. At block 1305, the first node receives the termination request. In response, at block 1306 the first node sends a termination response for the second network traffic flow. At block 1307, the first node performs a cleanup of the second network traffic flow. No record of the cleanup is created by the first node because the first node received a termination request for the second network traffic flow. At block 1308, the second node receives the termination acknowledgement. At block 1309, the second node performs a cleanup of the flow. At block 1310, the second node creates a record of the cleanup of the second network traffic flow. At block 1311, the second node creates a compressed flow log and, at block 1312 sends the compressed flow log to the flow log consumer. At block 1313, the first node creates a compressed flow log and, at block 1314 sends the compressed flow log to the flow log consumer. The compressed flow log from the second node includes a record of the cleanup of the second network flow. The first node does not include a record of the cleanup of the second network flow in a compressed flow log.

Reporting the cleanup or deletion of timed out network traffic flows is another opportunity for flow log entry deduplication. A network appliance processing network traffic flows can record the times at which it last processed a packet for each of the network traffic flows. A network traffic flow can be timed out when the time since a packet for the flow has been processed exceeds a threshold. In order to deduplicate the reporting of timed out flows, the network nodes can be configured such that the initiation destination for a timed out flow records the cleanup and the initiation source does not. In accordance with this policy, the initiation source can suppress the reporting of the cleanup of a timed out flow. This policy is synergistic with the previously described policy wherein the nodes are configured to suppress the reporting of the cleanup of a flow after receiving a termination request for that flow.

Figure 14:
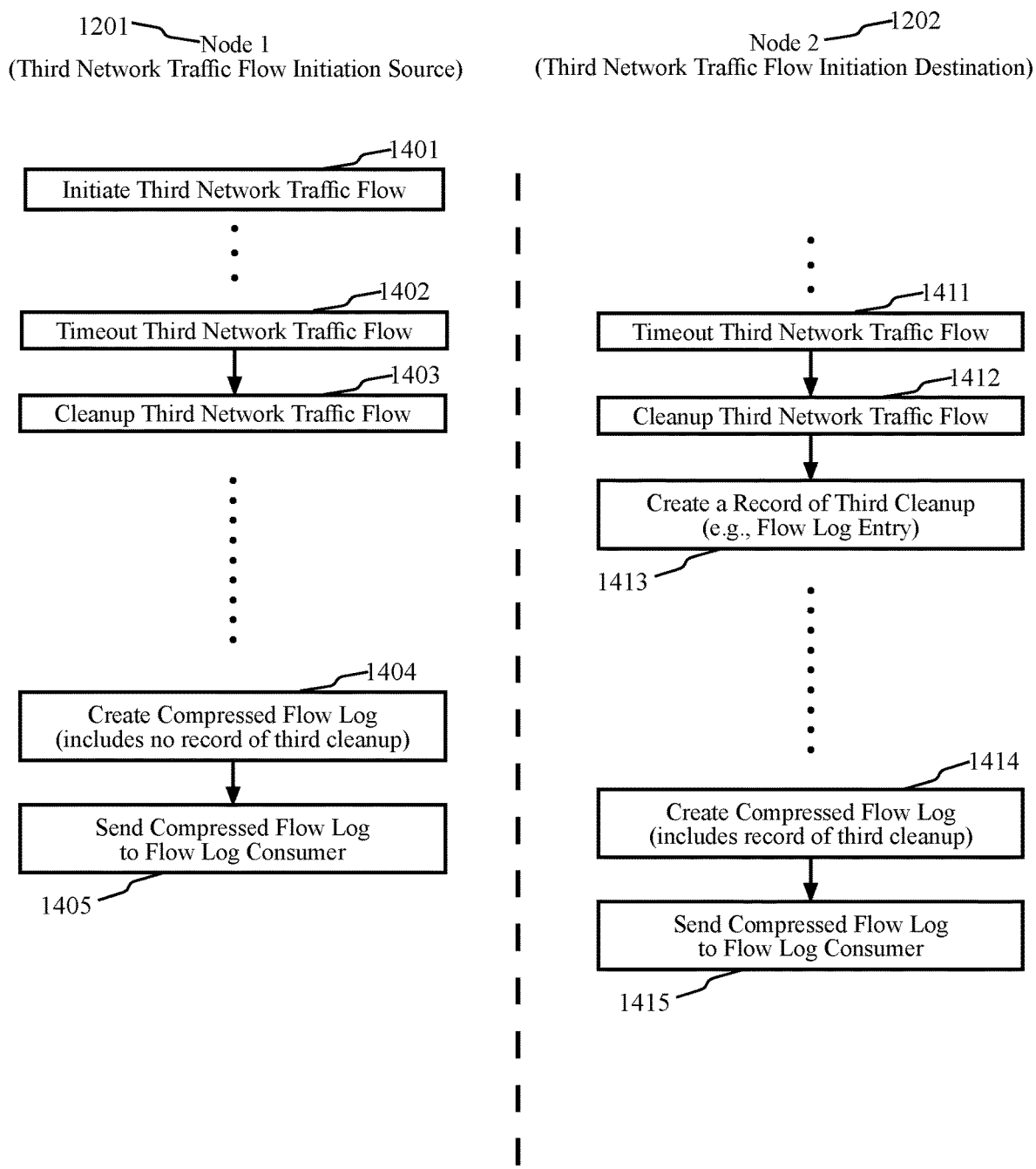
FIG. 14 illustrates a high-level flow diagram illustrating nodes coordinating the reporting of a record of a third cleanup according to some aspects.

FIG. 14 illustrates a high-level flow diagram illustrating nodes coordinating the reporting of a record of a third cleanup according to some aspects. At block 1401, the first node 1201 initiates a third network traffic flow with the second node 1202. As such, the first node is the initiation source and the second node is the initiation destination for the third network traffic flow. At block 1402, the first node times out the third network traffic flow. At block 1403, the first node cleans up the third network traffic flow. At block 1404 the first node creates a compressed flow log. At block 1405 the first node sends the compressed flow log to the flow log consumer. As the third network traffic flow's initiation source, the first node does not include a record of the cleanup of the third network traffic flow because the third network traffic flow timed out. At block 1411, the second node times out the third network traffic flow. At block 1412, the second node cleans up the third network traffic flow. At block 1413, the second node creates a record of the cleanup of the third network traffic flow. At block 1414 the second node creates a compressed flow log. At block 1415 the second node sends the compressed flow log to the flow log consumer. The compressed flow log from the second node includes a record of the cleanup of the third network traffic flow. As the third network traffic flow's initiation destination, the second node does not suppress reporting the cleanup of the timed out third network traffic flow.

Figure 15:
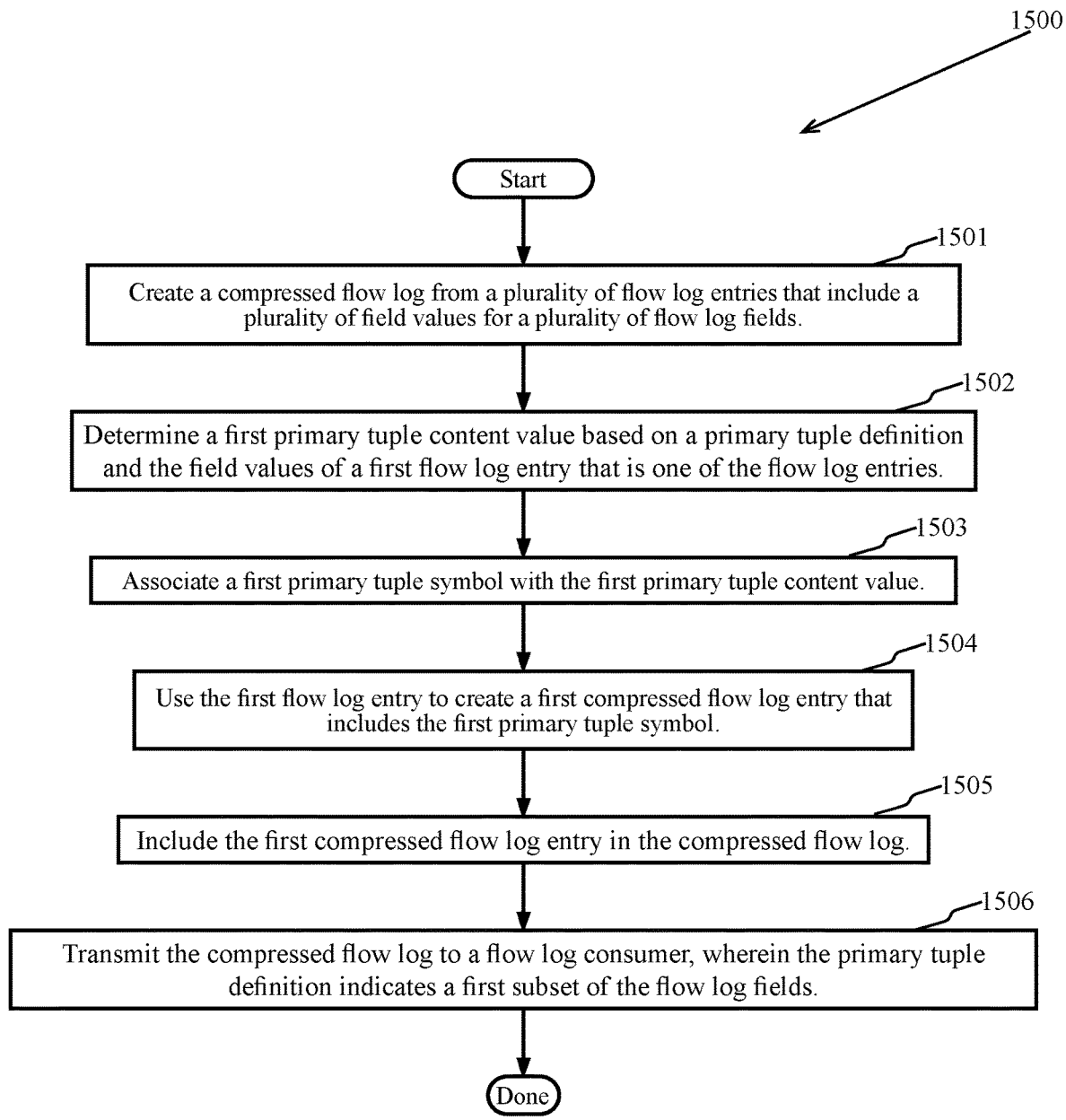
FIG. 15 is a high-level flow diagram illustrating some aspects that can be implemented in a method for flow log compression and coordination.

FIG. 15 is a high-level flow diagram illustrating some aspects that can be implemented in a method for flow log compression and coordination 1500. After the start, at block 1501, a compressed flow log is created from a plurality of flow log entries that include a plurality of field values for a plurality of flow log fields. At block 1502, a first primary tuple content value is determined based on a primary tuple definition and the field values of a first flow log entry that is one of the flow log entries. At block 1503, a first primary tuple symbol is associated with the first primary tuple content value. At block 1504, the first flow log entry is used to create a first compressed flow log entry that includes the first primary tuple symbol. At block 1505, the first compressed flow log entry is included in the compressed flow log. At block 1506, the compressed flow log is transmitted to a flow log consumer, wherein the primary tuple definition indicates a first subset of the flow log fields.

Figure 16:
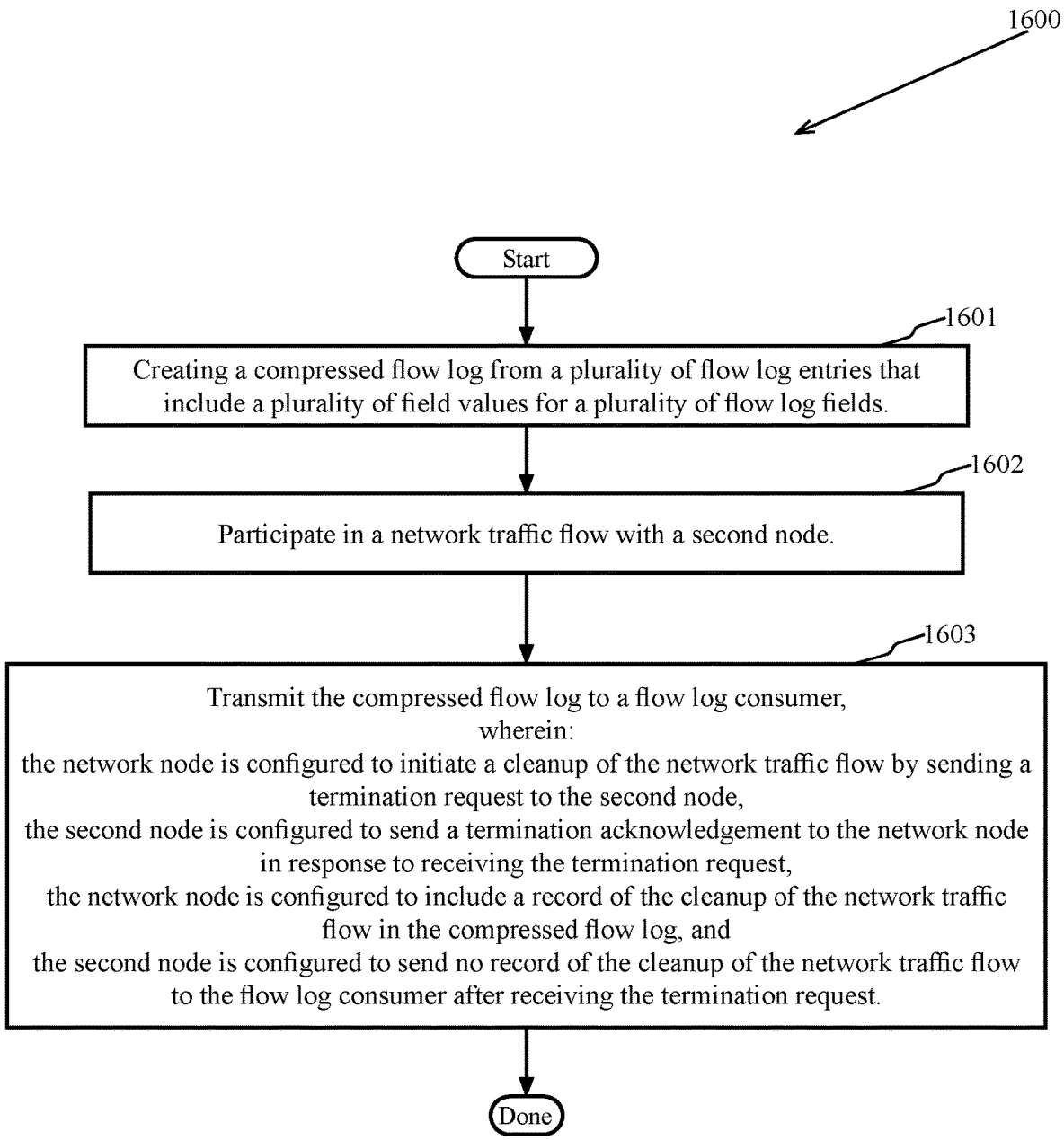
FIG. 16 is a high-level flow diagram illustrating some additional aspects that can be implemented in a method for flow log compression and coordination.

FIG. 16 is a high-level flow diagram illustrating some additional aspects that can be implemented in a method for flow log compression and coordination 1600. The method can be implemented by a network node. After the start, at block 1601, the network node creates a compressed flow log from a plurality of flow log entries that include a plurality of field values for a plurality of flow log fields. At block 1602, the network node participates in a network traffic flow with a second node. At block 1602, the network node transmits the compressed flow log to a flow log consumer wherein the network node is configured to initiate a cleanup of the network traffic flow by sending a termination request to the second node, the second node is configured to send a termination acknowledgement to the network node in response to receiving the termination request, the network node is configured to include a record of the cleanup of the network traffic flow in the compressed flow log, and the second node is configured to send no record of the cleanup of the network traffic flow to the flow log consumer after receiving the termination request.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
storing a primary tuple definition that indicates a first subset of a plurality of flow log fields;
receiving a plurality of flow log entries that include a plurality of field values for the plurality of-flow log fields;
determining a first primary tuple content value based on the primary tuple definition and first field values of a first flow log entry from the plurality of flow log entries;
associating a first primary tuple symbol with the first primary tuple content value;
using the first flow log entry to create a first compressed flow log entry that includes the first primary tuple symbol;
including the first compressed flow log entry in a compressed flow log; and
transmitting the compressed flow log to a flow log consumer,
wherein
the compressed flow log includes a plurality of compressed flow log entries, and
each one of the plurality of compressed flow log entries corresponds to only one of the flow log entries.

2. The method of claim 1, further including
using a second flow log entry to create a second compressed flow log entry that includes the first primary tuple symbol,
wherein
the compressed flow log includes the second compressed flow log entry, and
the second compressed flow log entry includes the first primary tuple symbol.

3. The method of claim 1, wherein
a second primary tuple content value is based on the primary tuple definition and second field values of a second flow log entry from the plurality of flow log entries,
a second primary tuple symbol is associated with the second primary tuple content value, and
the compressed flow log includes a second compressed flow log entry that includes the second primary tuple symbol.

4. The method of claim 1, wherein
a first secondary tuple content value is based on a secondary tuple definition and the first field values of the first flow log entry,
a first secondary tuple symbol is associated with the first secondary tuple content value,
a second flow log entry includes the first secondary tuple content value, and
the compressed flow log includes a second compressed flow log entry that includes the first secondary tuple symbol.

5. The method of claim 1 wherein the compressed flow log includes an anchor timestamp value and the first compressed flow log entry includes a timestamp offset indicating an amount of time relative to the anchor timestamp value.

6. The method of claim 1 further including:
participating in a network traffic flow, wherein
a cleanup of the network traffic flow is initiated by a termination requester that sends a termination request to a termination responder,
the termination responder is configured to send a termination acknowledgement to the termination requester in response to receiving the termination request,
the termination requester is configured to provide a record of the cleanup of the network traffic flow to the flow log consumer, and
the termination responder is configured to send no record of the cleanup of the network traffic flow to the flow log consumer after receiving the termination request.

7. The method of claim 1 further including:
participating in a network traffic flow that has an initiation source and an initiation destination;
determining that the network traffic flow is inactive; and
cleaning up the network traffic flow,
wherein
the initiation destination is configured to provide a record of cleaning up of the network traffic flow to the flow log consumer, and
the initiation source is configured to provide no record of cleaning up of the network traffic flow to the flow log consumer.

8. A method implemented by a network node, the method comprising:
creating a compressed flow log from a plurality of flow log entries that include a plurality of field values for a plurality of flow log fields;
participating in a network traffic flow with a second node; and
transmitting the compressed flow log to a flow log consumer,
wherein:
the network node is configured to initiate a cleanup of the network traffic flow by sending a termination request to the second node,
the second node is configured to send a termination acknowledgement to the network node in response to receiving the termination request,
the network node is configured to include a record of the cleanup of the network traffic flow in the compressed flow log, and
the second node is configured to send no record of the cleanup of the network traffic flow to the flow log consumer after receiving the termination request.

9. The method of claim 8, wherein
the network node is configured to cleanup a second network traffic flow after receiving a second termination request from the second node,
the network node is configured to send a second termination acknowledgement in response to the second termination request, and
the network node is configured to send no record of the cleanup of the second network traffic flow to the flow log consumer after receiving the second termination request.

10. The method of claim 8, wherein
the network node is configured to perform an inactive flow cleanup of the network traffic flow after determining that the network traffic flow is inactive,
the network traffic flow has an initiation source and an initiation destination,
the initiation destination is configured to provide a record of the inactive flow cleanup of the network traffic flow to the flow log consumer, and
the initiation source is configured to provide no record of the inactive flow cleanup of the network traffic flow to the flow log consumer.

11. The method of claim 10, wherein
a first primary tuple content value is based on a primary tuple definition and first field values of a first flow log entry from the plurality of flow log entries,
a first primary tuple symbol is associated with the first primary tuple content value,
a first compressed flow log entry that is based on the first flow log entry and that includes the first primary tuple symbol is included in the compressed flow log, and
the primary tuple definition indicates a first subset of the plurality of flow log fields.

12. The method of claim 11 wherein the compressed flow log includes an anchor timestamp value and the first compressed flow log entry includes a timestamp offset indicating an amount of time relative to the anchor timestamp value.

13. The method of claim 11, wherein
the compressed flow log includes a second compressed flow log entry based on a second flow log entry, and
the second compressed flow log entry includes the first primary tuple symbol.

14. The method of claim 11, wherein
a second primary tuple content value is based on the primary tuple definition and second field values of a second flow log entry from the plurality of flow log entries,
a second primary tuple symbol is associated with the second primary tuple content value, and
the compressed flow log includes a second compressed flow log entry that includes the second primary tuple symbol.

15. The method of claim 11, wherein
a first secondary tuple content value is based on a secondary tuple definition and the first field values of the first flow log entry,
a first secondary tuple symbol is associated with the first secondary tuple content value,
a second flow log entry includes the first secondary tuple content value, and
the compressed flow log includes a second compressed flow log entry that includes the first secondary tuple symbol.

16. The method of claim 11 wherein the compressed flow log includes a dictionary that associates a plurality of tuple symbols with a plurality of tuple content values.

17. A network node comprising:
memory; and
a general purpose processor operatively coupled to the memory,
wherein
the network node stores a primary tuple definition that indicates a first subset of a plurality of flow log fields,
a plurality of flow log entries includes a plurality of field values for the plurality of flow log fields,
the network node determines a first primary tuple content value based on the primary tuple definition and first field values of a first flow log entry from the plurality of flow log entries,
the network node associates a first primary tuple symbol with the first primary tuple content value,
the network node uses the first flow log entry to create a first compressed flow log entry that includes the first primary tuple symbol,
the network node includes the first compressed flow log entry in the compressed flow log,
the network node transmits the compressed flow log to a flow log consumer,
the compressed flow log includes a plurality of compressed flow log entries, and
each one of the plurality of compressed flow log entries corresponds to only one of the flow log entries.

18. The network node of claim 17, wherein the network node is configured to:
participate in a network traffic flow with a second node;
initiate a cleanup of the network traffic flow by sending a termination request to the second node;
receive a termination acknowledgement sent in response to the termination request;
include a record of the cleanup of the network traffic flow in the compressed flow log;
cleanup a second network traffic flow after receiving a second termination request from the second node;
send a second termination acknowledgement in response to the second termination request; and
send no record of the cleanup of the second network traffic flow to the flow log consumer after receiving the second termination request.

19. The network node of claim 18 wherein:

the network node is configured to perform an inactive flow cleanup of the network traffic flow after determining that the network traffic flow is inactive;

the network traffic flow has an initiation source and an initiation destination;

the initiation destination is configured to provide a record of the inactive flow cleanup of the network traffic flow to the flow log consumer; and the initiation source is configured to provide no record of the inactive flow cleanup of the network traffic flow to the flow log consumer.

20. The network node of claim 17 wherein:

the network node determines a remaining flow log entry field value that is a field value for one of the flow log fields that is not in the first subset; and the first compressed flow log entry further includes the remaining flow log entry field value.

\* \* \* \* \*